(12) United States Patent
Seok et al.

(10) Patent No.: US 11,490,251 B2
(45) Date of Patent: Nov. 1, 2022

(54) SYSTEM AND METHOD OF SECURE RANGING MEASUREMENT

(71) Applicant: MEDIATEK INC., Hsin-Chiu, CA (US)

(72) Inventors: Yongho Seok, San Jose, CA (US); Chao-Chun Wang, San Jose, CA (US); Chih-Shi Yee, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 1150 days.

(21) Appl. No.: 16/030,710

(22) Filed: Jul. 9, 2018

(65) Prior Publication Data

US 2019/0014466 A1 Jan. 10, 2019

Related U.S. Application Data

(60) Provisional application No. 62/628,315, filed on Feb. 9, 2018, provisional application No. 62/595,123, filed on Dec. 6, 2017, provisional application No. 62/594,041, filed on Dec. 4, 2017, provisional application No. 62/566,804, filed on Oct. 2, 2017, provisional application No. 62/550,027, filed on Aug.
(Continued)

(51) Int. Cl.
| | |
|---|---|
| *H04W 12/04* | (2021.01) |
| *H04W 12/06* | (2021.01) |
| *H04L 9/40* | (2022.01) |
| *H04W 84/12* | (2009.01) |
| *H04W 12/12* | (2021.01) |
| *H04W 24/10* | (2009.01) |
| *H04W 4/02* | (2018.01) |

(52) U.S. Cl.
CPC ......... *H04W 12/04* (2013.01); *H04L 63/1441* (2013.01); *H04W 12/06* (2013.01); *H04W 12/12* (2013.01); *H04W 24/10* (2013.01); *H04W 84/12* (2013.01); *H04W 4/025* (2013.01)

(58) Field of Classification Search
CPC ...... H04W 12/04; H04W 12/06; H04W 24/10
See application file for complete search history.

(56) References Cited

U.S. PATENT DOCUMENTS

| | | | |
|---|---|---|---|
| 11,166,159 B1 * | 11/2021 | Berger | ................. H04W 12/63 |
| 2014/0169290 A1 * | 6/2014 | Seok | ................. H04W 74/006 |
| | | | 370/329 |

(Continued)

FOREIGN PATENT DOCUMENTS

WO 2015130712 A1 9/2015

OTHER PUBLICATIONS

Ganesh Venkatesan et al, 802.11az Negotiation, doc.: IEEE P802.11-17-0591r2, May 10, 2017, XP055527483.

(Continued)

*Primary Examiner* — Samina F Choudhry

(57) ABSTRACT

Methods and apparatus for performing secure ranging measurements between wireless devices are disclosed herein according to embodiments of the present invention. The described embodiments use key values to indicate which LTF sequence (e.g., LTF measurement exchange) to use for performing wireless ranging measurements. A LTF sequence that is received by a wireless device that does not correspond with the associated key value is determined to be invalid. Invalid LTF sequences may be disregarded as signal noise.

17 Claims, 13 Drawing Sheets

Related U.S. Application Data

25, 2017, provisional application No. 62/530,357, filed on Jul. 10, 2017.

(56) References Cited

U.S. PATENT DOCUMENTS

| | | |
|---|---|---|
| 2016/0323424 A1* | 11/2016 | Merlin ............... H04L 25/0226 |
| 2017/0064575 A1 | 3/2017 | Eyal et al. |
| 2017/0149799 A1 | 5/2017 | Vamaraju et al. |
| 2017/0261591 A1 | 9/2017 | Zhang et al. |
| 2018/0027561 A1 | 1/2018 | Segev et al. |
| 2018/0287826 A1 | 10/2018 | Lindskog et al. |

OTHER PUBLICATIONS

Erik Lindskog et al, Ranging PHY Security, doc.: IEEE 802.11-17/0780r2, May 10, 2017, XP068116063.

* cited by examiner

SYSTEM AND METHOD OF SECURE RANGING MEASUREMENT

CROSS-REFERENCE TO RELATED APPLICATIONS

This application claims the benefit of and priority to provisional patent application Ser. No. 62/530,357, with filing date Jul. 10, 2017, and hereby incorporated by reference in its entirety.

This application claims the benefit of and priority to provisional patent application Ser. No. 62/550,027, with filing date Aug. 25, 2017, and hereby incorporated by reference in its entirety.

This application claims the benefit of and priority to provisional patent application Ser. No. 62/566,804, with filing date Oct. 2, 2017, and hereby incorporated by reference in its entirety.

This application claims the benefit of and priority to provisional patent application Ser. No. 62/594,041, with filing date Dec. 4, 2017, and hereby incorporated by reference in its entirety.

This application claims the benefit of and priority to provisional patent application Ser. No. 62/595,123, with filing date Dec. 6, 2017, and hereby incorporated by reference in its entirety.

This application claims the benefit of and priority to provisional patent application Ser. No. 62/628,315, with filing date Feb. 9, 2018, and hereby incorporated by reference in its entirety.

This application is related to copending patent application Ser. No. 16/030,718, entitled "SECURE SU AND MU RANGING MEASUREMENT PROCEDURE," which is hereby incorporated by reference in its entirety.

FIELD

Embodiments of the present invention generally relate to the field of wireless communications. More specifically, embodiments of the present invention relate to systems and methods for measuring distances between devices using wireless and electronic communications.

BACKGROUND

There is a growing need, in the field of wireless communication, to accurately and securely determine distances (ranging) between wireless devices (e.g., wireless stations (STAs) and access points (APs)). Existing approaches to determining distances between wireless devices are vulnerable to physical-level security attacks from malicious actors, such as denial of services attacks, perturbation attacks, and spoofing attacks.

Spoofing attacks are potentially a very dangerous form of security threat when performing ranging between wireless devices. During a spoofing attack, the attacker interferes with the victim's ranging and is thereby able to control (e.g., "spoof") the victim's perceived range. For example, some applications for wireless ranging require heightened security, such as when using wireless ranging for accessing electronic door locks, computer locks, and ATMs that provide access to funds of a bank account. In these cases, the spoofed ranging measurement should be identified as invalid and discarded to prevent property loss.

Other forms of security attacks concerning wireless ranging, such as denial of service attacks, are very difficult to protect against. In a denial of service attack, the attacker interferes with the ranging signal in such a way to prevent the AP from providing services as intended. Perturbation attacks interfere with the victims ranging, but the attacker is unable to control the resulting range as perceived by the victim.

What is needed is a technique for preventing spoofing attacks, especially in high security use cases such as electronic locks and ATMs, for example. One existing approach is to encode the long training field (LTF) sequence transmitted in a null data packet (NDP) to the AP; however, even though the LTF sequence is encoded, an attacker can use the exposed NDP as a replay attack, as depicted in FIG. 1. Therefore, more robust security measures are needed to prevent a replay attack using an exposed NDP.

SUMMARY

Method and apparatus for performing secure ranging measurements between wireless devices are disclosed herein according to embodiments of the present invention. The described embodiments use key values to indicate which LTF sequence (e.g., LTF measurement exchange) to use for performing wireless ranging measurements. A LTF sequence that is received by a wireless device that does not correspond with the associated key value is determined to be invalid. Invalid LTF sequences may be disregarded as signal noise.

According to one embodiment, a method of performing a ranging measurement using a wireless access point is disclosed. The method includes: a) transmitting a key management frame from a first wireless device, where the key management frame includes a plurality of key values and associated LTF Generation SACs; b) receiving an NDP announcement frame comprising the LTF Generation SACs from a second wireless device; c) receiving an UL-NDP frame from the second wireless device, where the UL-NDP frame includes a first LTF sequence determined according to a first key value of the plurality of key values; d) transmitting a DL-NDP frame transmitted from the first wireless device, where the DL-NDP frame includes a second LTF sequence determined according to a second key value of the plurality of key values; and e) computing ranging measurements between the first wireless device and the second wireless device using the first and second LTF sequences.

According to a second embodiment, a device for performing a ranging measurement using a wireless access point is disclosed. The device includes a memory for storing data and a processor communicatively coupled to the memory and configured to execute instructions for performing a method of ranging measurement. The method includes: a) receiving a key management frame, where the key management frame includes a plurality of key values and associated LTF Generation SACs; b) transmitting an NDP announcement frame, where the NDP announcement frame comprises the LTF Generation SACs; c) transmitting a UL-NDP frame, where the UL-NDP frame comprises a first LTF sequence determined according to a first key value of the plurality of key values; d) receiving a DL-NDP frame from a first wireless device, where the DL-NDP frame comprises a second LTF sequence corresponding to a second key value of the plurality of key values; and e) receiving a ranging measurements between the first wireless device and the second wireless device, where the ranging measurement is computed using the first and second LTF sequences.

According to another embodiment, a device for performing a ranging measurement between wireless devices is disclosed. The device includes a memory for storing data and a processor communicatively coupled to the memory and configured to execute instructions for performing a method of ranging measurement. The method includes: a) transmitting a key management frame from a first wireless device, where the key management frame includes a plurality of key values and associated LTF Generation SACs; b) receiving an NDP announcement frame comprising the LTF Generation SACs from a second wireless device; c) receiving an UL-NDP frame from the second wireless device, where the UL-NDP frame includes a first LTF sequence corresponding to a first key value of the plurality of key values; d) transmitting a DL-NDP frame transmitted from the first wireless device, where the DL-NDP frame includes a second LTF sequence corresponding to a second key value of the plurality of key values; e) authenticating that the first LTF sequence and the second LTF sequence are generated from reliable LTF Sequence Generation Information using the associated LTF Generation SACs; and f) computing ranging measurements between the first wireless device and the second wireless device using the first and second LTF sequences.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1A:
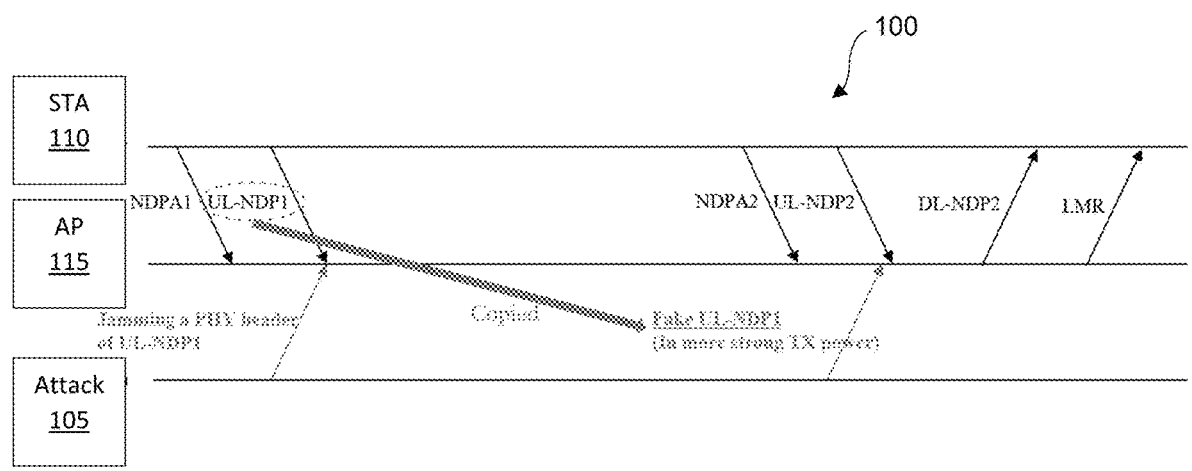
FIG. 1A is a transmit and receive diagram of an exemplary replay spoofing attack sequence involving an attacker STA, a victim STA, and a wireless AP.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 3B, 5B, and 7B) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying," "encoding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Secure Ranging Measurement

Embodiments of the present invention provide securing ranging measurements for wireless devices. With regard to the timing events of FIG. 1, events within an exemplary replay spoofing attack involving an attacker STA 105, a victim STA 110, and a wireless AP 115 are depicted in transmit and receive diagram 100. The exemplary transmit sequence depicted in FIG. 1 begins with the victim STA 110 transmitting a null data packet announcement (NDPA) frame NDPA1 to the AP 115. Subsequently, the victim STA 110 transmits a corresponding uplink NDP UL-NDP1. The UL-NDP1 frame includes an encoded LTF sequence for performing wireless ranging.

Once the UL-NDP1 has been transmitted by victim STA 105, the attacker STA 105 jams a PHY header of the UL-NDP1 frame and copies the exposed NDP to use as a replay attack. Because the attacker STA 105 has jammed the PHY header of the UL-NDP1 frame, the AP 115 is unaware that the victim STA 110 has transmitted the UL-NDP1 frame and therefore considers the spoofed UL-NDP1 frame transmitted by the attacker STA 105 to be a valid frame sequence.

After the victim STA 110 transmits a second NDPA frame NDPA2, the attacker STA 105 provides the spoofed UL-NDP1 frame to the AP 115, which may be transmitted at a higher TX power to overcome the UL-NDP2 frame transmitted by the victim STA 110. As such, the location measurement report (LMR) provided by the AP 115 to the victim STA 110 is calculated based on the spoofed UL-NDP1 frame. In this way, the attacker STA 105 can control the distance measured between the victim STA 110 and the AP 115, thereby compromising the security of the victim STA 110.

Figure 1B:
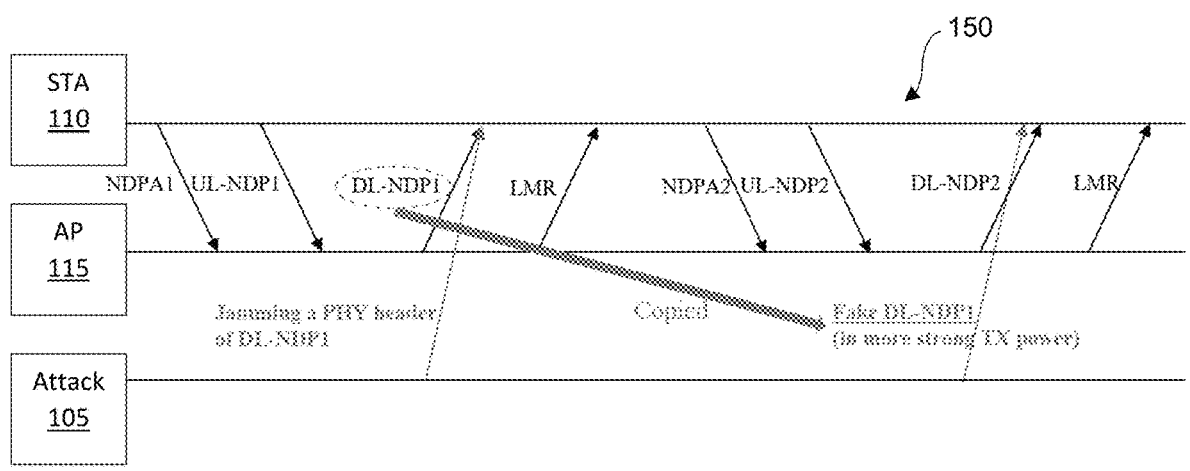
FIG. 1B is a transmit and receive diagram of an exemplary replay spoofing attack involving a downlink NDP DL-NDP jammed by an attacker STA.

With regard to the timing events of FIG. 1B, an exemplary replay spoofing attack involving attacker STA 105, victim STA 110, and wireless AP 115 is depicted in transmit and receive diagram 200, where a downlink NDP DL-NDP1 is jammed by the attacker STA 105. The exemplary transmit sequence beings with the victim STA 110 transmitting a null data packet announcement (NDPA) frame NDPA1 to the AP 115. Subsequently, the victim STA 110 transmits a corresponding uplink NDP UL-NDP1. The UL-NDP1 frame includes an encoded LTF sequence for performing wireless ranging.

Once the UL-NDP1 has been transmitted by victim STA 105, the AP 115 responds with a corresponding DL-NDP1 frame for performing a wireless ranging measurement. At this time, the attacker STA 105 jams a PHY header of the DL-NDP1 frame and copies the exposed NDP to use as a replay attack. Because the attacker STA 105 has jammed the PHY header of the DL-NDP1 frame, the victim STA 110 is unaware that the AP 115 has transmitted the DL-PDP1 frame and therefore considers the spoofed the DL-NDP1 frame transmitted by the attacker STA 105 to be a valid frame sequence.

After the victim STA 110 transmits a second UL-NDP frame UL-NDP2, the attacker STA 105 provides the spoofed DL-NDP1 frame to the victim STA 110, which may be transmitted at a higher TX power to overcome the DL-NDP2 frame transmitted by the AP 115. As such, the location measurement report (LMR) provided by the AP 115 to the victim STA 110 is calculated based on the spoofed DL-NDP1 frame. In this way, the attacker STA 105 can control the distance measured between the victim STA 110 and the AP 115, thereby compromising the security of the victim STA 110.

Accordingly, to address spoofing replay attacks such as those depicted in the transmit and receive diagrams of FIGS. 1A and 1B, embodiments of the present invention provide a mechanism to verify that the LTF sequence of a received NDP originates from a valid STA. For example, with regard to the transmit and receive diagram of FIG. 1A, according to embodiments of the present invention, after receiving the NDPA2 and the spoofed UL-NDP1, an AP can verify that the received UL-NDP1 is not valid. Further, with regard to the transmit and receive diagram of FIG. 1B, according to embodiments of the present invention, after receiving the spoofed DL-NDP1 and the LMR, a STA can verify that the received DL-NDP1 is not valid.

Exemplary methods for implementing these verification mechanisms are described below according to embodiments of the present invention. The described methods use key values to indicate which LTF sequence (e.g., LTF measurement exchange) to use for performing wireless ranging measurements.

Secure Ranging Measurement Procedures for SU Modes

Embodiments of the present invention provide secure ranging measurements for wireless devices in SU mode. Specifically, a signaling procedure between an initiating wireless station (ISTA) and a responding wireless station (RSTA) is used to enable protection of randomized LTF sequences used in the secure ranging measurements. The signaling procedure may be performed in a High Efficiency (HEz) or Very High Throughput (VHTz) mode and may include performing error recovery when operating in the HEz mode.

Figure 2A:
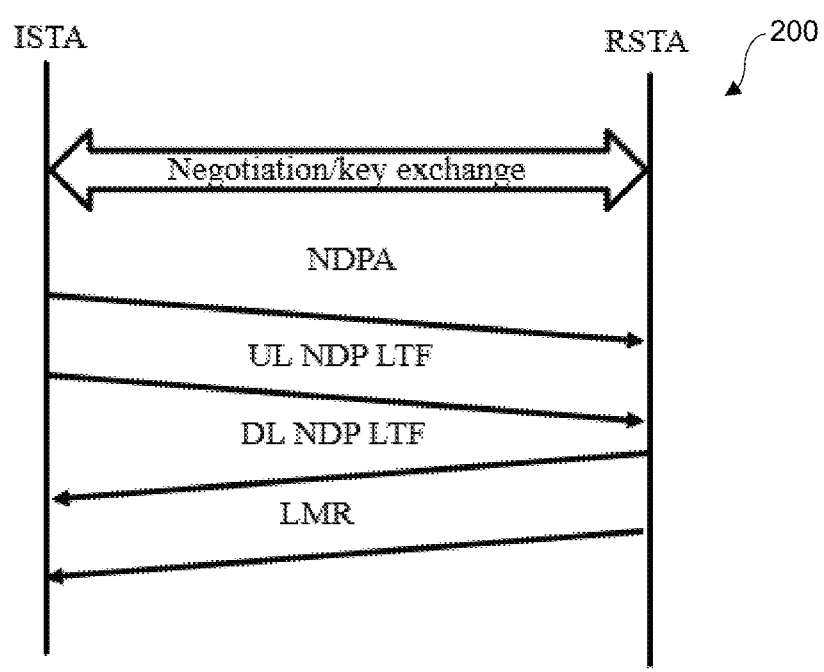
FIG. 2A is an exemplary transmit and receive diagram illustrating an exemplary key or cypher sequence exchange and establishment for long training field (LTF) generation between wireless devices depicted according to embodiments of the present invention.

With regard to FIG. 2A, an exemplary transmit and receive diagram 200 is depicted according to embodiments of the present invention. Diagram 200 illustrates an exemplary key or cypher sequence exchange and establishment for long training field (LTF) generation in SU mode between an ISTA and a RSTA. The sequence exchange is depicted in the non-time critical fine time measurement (FTM) negation phase. The sequence generation information for a first measurement is included in an initiating FTM (IFTM). The measurement phase begins only when the negotiation has completed successfully. According to some embodiments, the sequence generation information for a first measurement instance is included in an initiating FTM frame (IFTM).

After the negotiation and key exchange is complete, the ISTA transmits a NDPA frame to the RSTA, and the NDPA frame may include LTF sequence generation information.

The ISTA also transmits a UL-NDP frame with an LTF sequence generated according to the LTF sequence generation information and an exchanged key value. In response, the responding RSTA transmits s DL-NDP frame with an LTF sequence generated according to the LTF sequence generation information and the exchanged key value. Based on ranging measurements performed using the LTF sequences, an LMR is transmitted from the RSTA to the ISTA.

Exemplary Secure SU Ranging Measurement Procedure

Figure 2B:
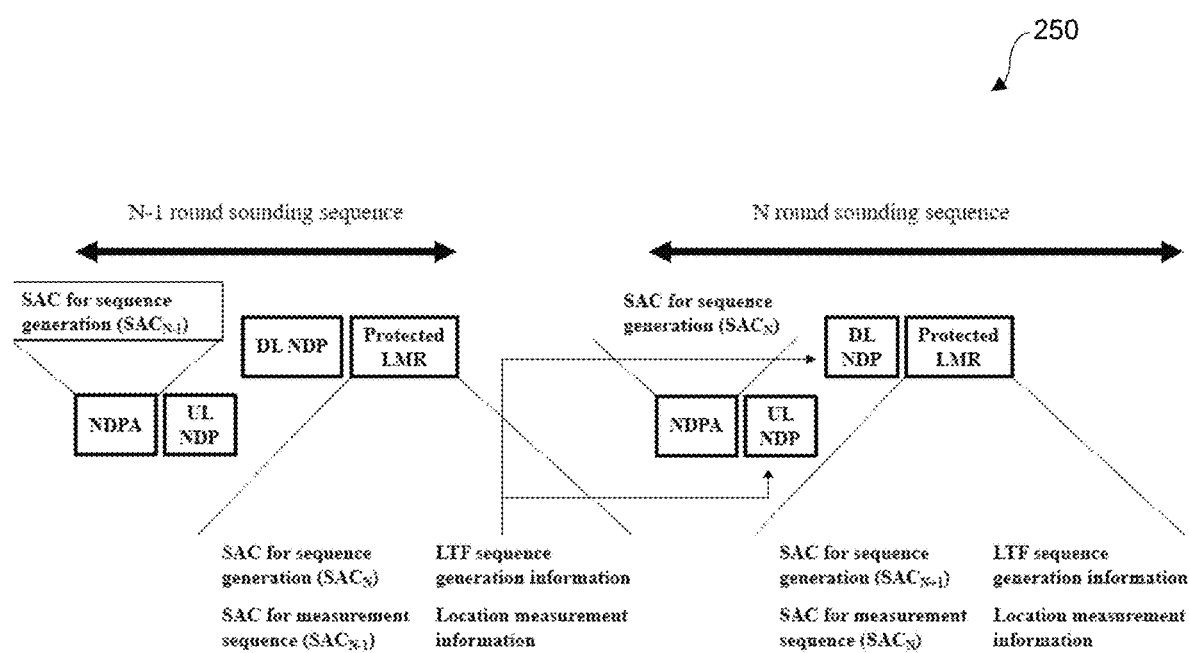
FIG. 2B depicts an exemplary secure SU ranging measurement procedure including an immediate LMR report according to embodiments of the present invention.

With regard to FIG. 2B, an exemplary secure SU ranging measurement procedure 250 including an immediate LMR report is depicted according to embodiments of the present invention. For SU operation, delayed sequence generation is preferred where sequence generation information is carried in the previous sounding sequence instance (N−1), and the frame used to deliver subsequent LTF sequence generation information is the protected location measurement report (LMR) frame of round N. For example, as depicted in FIG. 2B, the LTF sequence generation information included in the protected LMR from sounding sequence round N−1 is used to generate the LTF sequences of the UL-NDP and DL-NDP for sounding sequence round N. The LTF sequence generation information is generated according to a Sequence Authentication Code (SAC). The null data packet announcement (NDPA) frame carries the SAC indication, and a specific reserved value indicates "New LTF generation information needed".

The SAC is also included in the IFTM for the first measurement instance and in the LMR for subsequent measurements. Moreover, the size of the SAC should be sufficiently long to prevent simple guessing as an adversary who does not know the SAC and is unable to predict it cannot subversively trigger the measurement instance. In addition, the SAC and its associated measurement results are carried in the LMR. If an incorrect SAC is received by the RSTA, the RSTA discards the NDPA and keeps the current SAC and associated LTF sequence generation information.

The LMR is an Action non ACK frame and requires a procedure for recovery in the case of LMR reception failure. For example, if the LMR is not correctly received, the ISTA can return to the channel and transmit an NDPA indicating "New LTF generation information needed". The previous LTF generation information is therefore invalidated. In this case, for the UL-NDP, the ISTA uses a known UL-NDP LTF sequence (not suitable for measurement). For the DL-NDP, the RSTA may use the secured DL-NDP LTF sequence (not suitable for measurement). The RSTA then sends new protected LMR content. The ISTA may return to the channel and initiate a new sounding sequence after minToaReady has passed.

Providing Key Values in UL-NDP and DL-NDP Frames

Figure 3A:
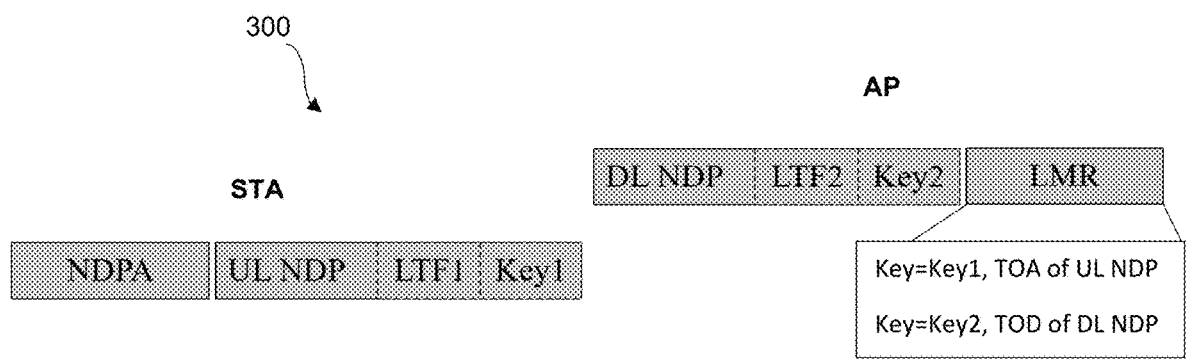
FIG. 3A is a transmit and receive diagram depicting an exemplary method for providing key values to determine an LTF sequence used for performing wireless ranging measurements depicted according to embodiments of the present invention.

With regard to FIG. 3A, an exemplary transmit and receive sequence 300 depicting an exemplary method for providing key values to determine an LTF sequence used for performing wireless ranging measurements is depicted according to embodiments of the present invention. A UL-NDP frame and a DL-NDP frame include the key values for determining LTF sequences at the end of the frame. An LMR frame includes key values for indicating the LTF sequence carried in the received UL-NDP and the transmitted DL-NDP. In FIG. 3A, the key values in the LMR match Key1 of the UL-NDP, and match Key2 of the DL-NDP. Therefore, the UL-NDP and DL-NDP frames are determined to be valid, and the LMR is determined to include a valid ranging measurement.

Figure 3B:
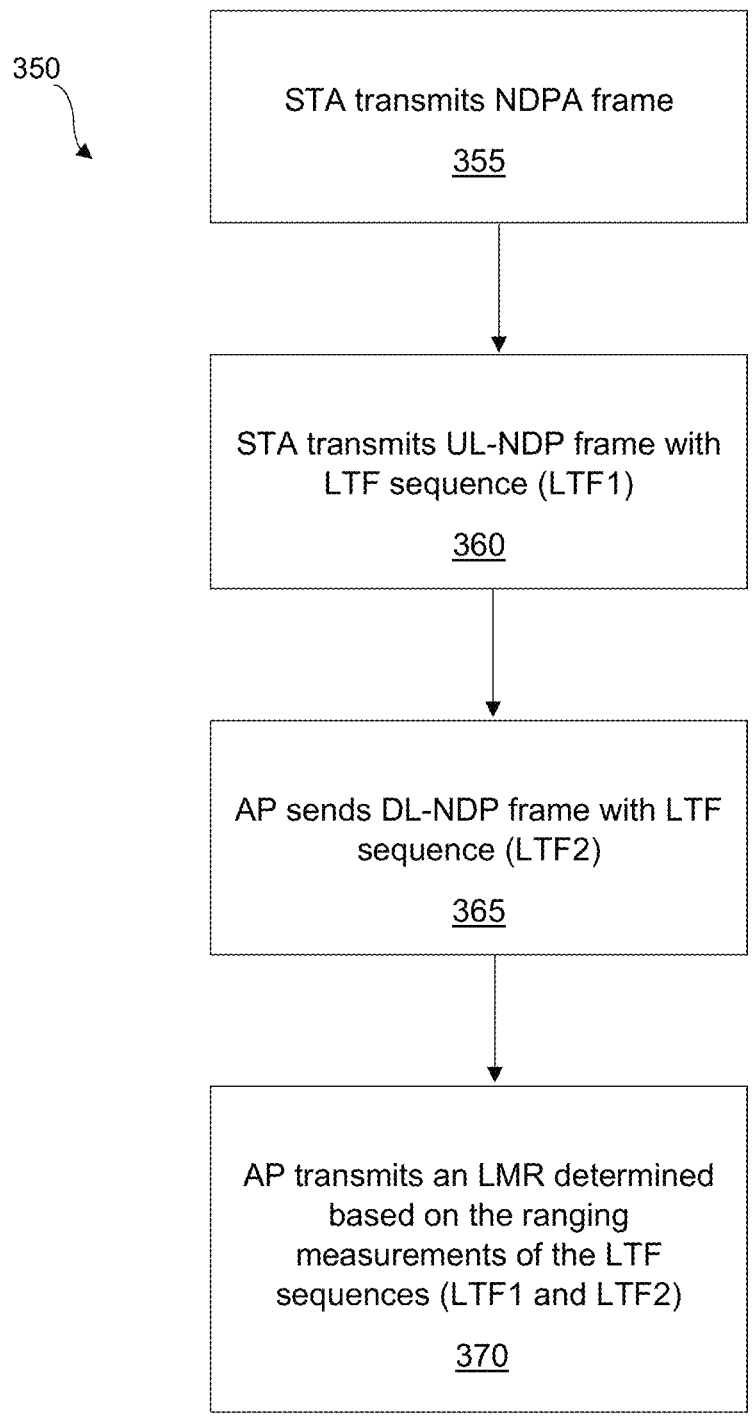
FIG. 3B is a flow chart depicting an exemplary sequence of computer implemented steps for performing a method of secure ranging measurement between a STA and an AP using key values to determine an LTF sequence according to embodiments of the present invention.

FIG. 3B is a flow chart depicting an exemplary sequence of computer implemented steps 350 for performing a method of secure ranging measurement between a STA and an AP according to embodiments of the present invention. At step 355, a NDPA frame is transmitted by a STA. At step 360, the STA transmits a UL-NDP frame including LTF sequence (e.g., an LTF measurement exchange) LTF1 and a key value Key1. Key1 in the UL-NDP frame indicates an LET sequence of LTF1, and Key2 in the DL-NDP frame indicates an LTF sequence of LTF2. At step 365, a DL-NDP frame is sent by the AP including LTF sequence LTF2. At step 370, the AP transmits an LMR determined based on the ranging measurements of the LTF sequences LTF1 and LTF2. The LMR frame includes the key values carried in the received UL-NDP and transmitted DL-NDP. If the key values of the UL-NDP and DL-NDP used in a ranging measurement from the AP do not match those of the transmitted and received NDPs on the STA, the received LMR is determined to be invalid.

Figure 4:
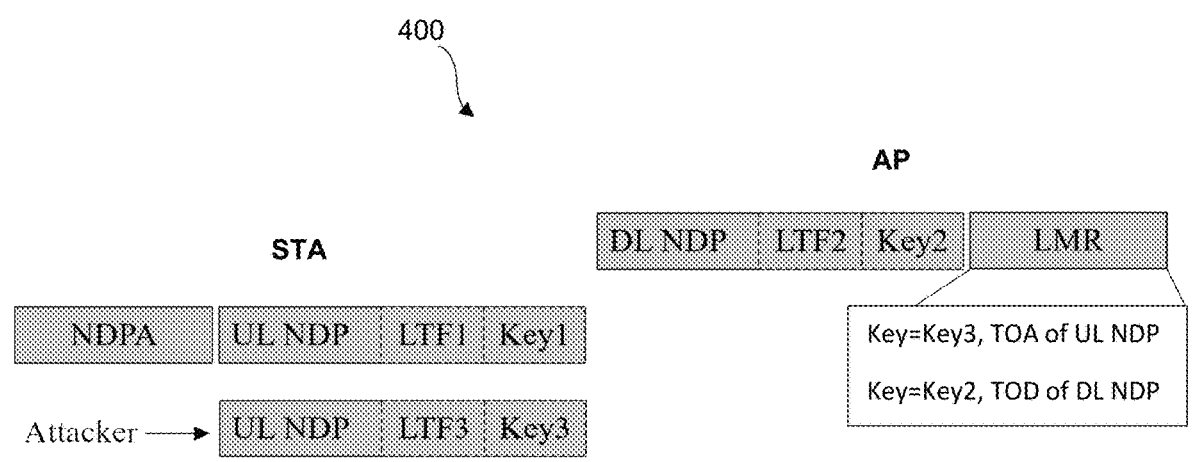
FIG. 4 is a transmit and receive diagram depicting an exemplary method for providing key values where the key values provided in the UL-NDP and the DL-NDP do not match the key values of the NDPs transmitted and received by the victim STA according to embodiments of the present invention.

With regard to FIG. 4, a transmit and receive sequence 400 depicting an exemplary method for providing key values to determine an LTF sequence is depicted according to embodiments of the present invention. The key values provided in the UL-NDP and the DL-NDP do not match the key values of the NDPs transmitted and received by the victim STA, and therefore the STA determines that the LTF sequence of the UL-NDP is invalid. In this way, the victim STA determines that the LTF sequence of the UL-NDP used in the time of arrival (TOA) calculation is different than expected because (Key1 does not match Key2) so the LMR is considered to include an invalid ranging measurement.

Providing Key Values in an NDPA Frame

Figure 5A:
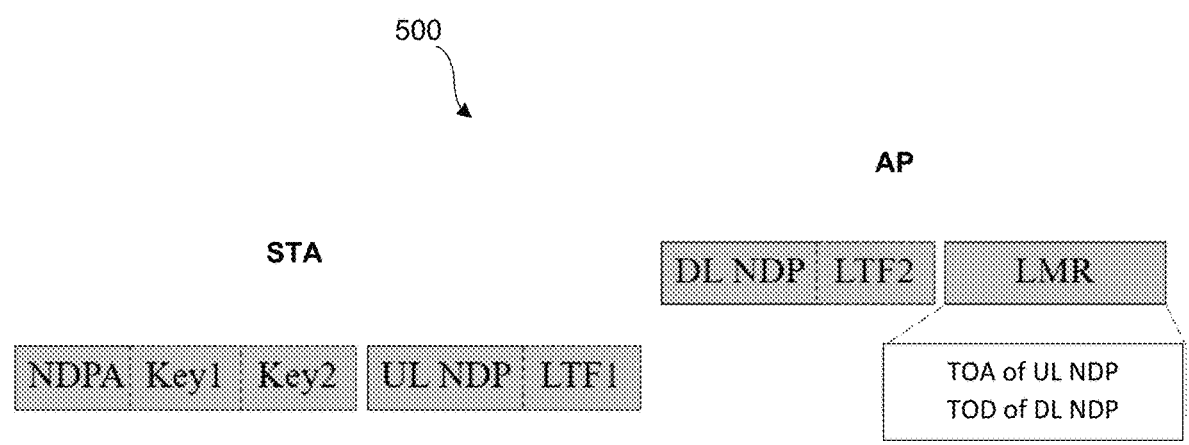
FIG. 5A is a transmit and receive diagram depicting an exemplary method for providing key values in an NDPA to determine an LTF sequence according to embodiments of the present invention.

Referring to FIG. 5A, a transmit and receive sequence 500 depicting an exemplary method for providing key values in an NDPA to determine an LTF sequence is depicted according to embodiments of the present invention. Specifically, the key value Key1 in the NDPA indicates that the UL-NDP uses LTF sequence LTF1, and the key value Key2 in the NDPA indicates that the DL-NDP uses LTF sequence LTF2. In this case, because the key values are obtained prior to the NDP transmission, a nonlinear mapping between key values and LTF sequences may be employed, and the STA and AP exchange related security parameters accordingly.

Figure 5B:
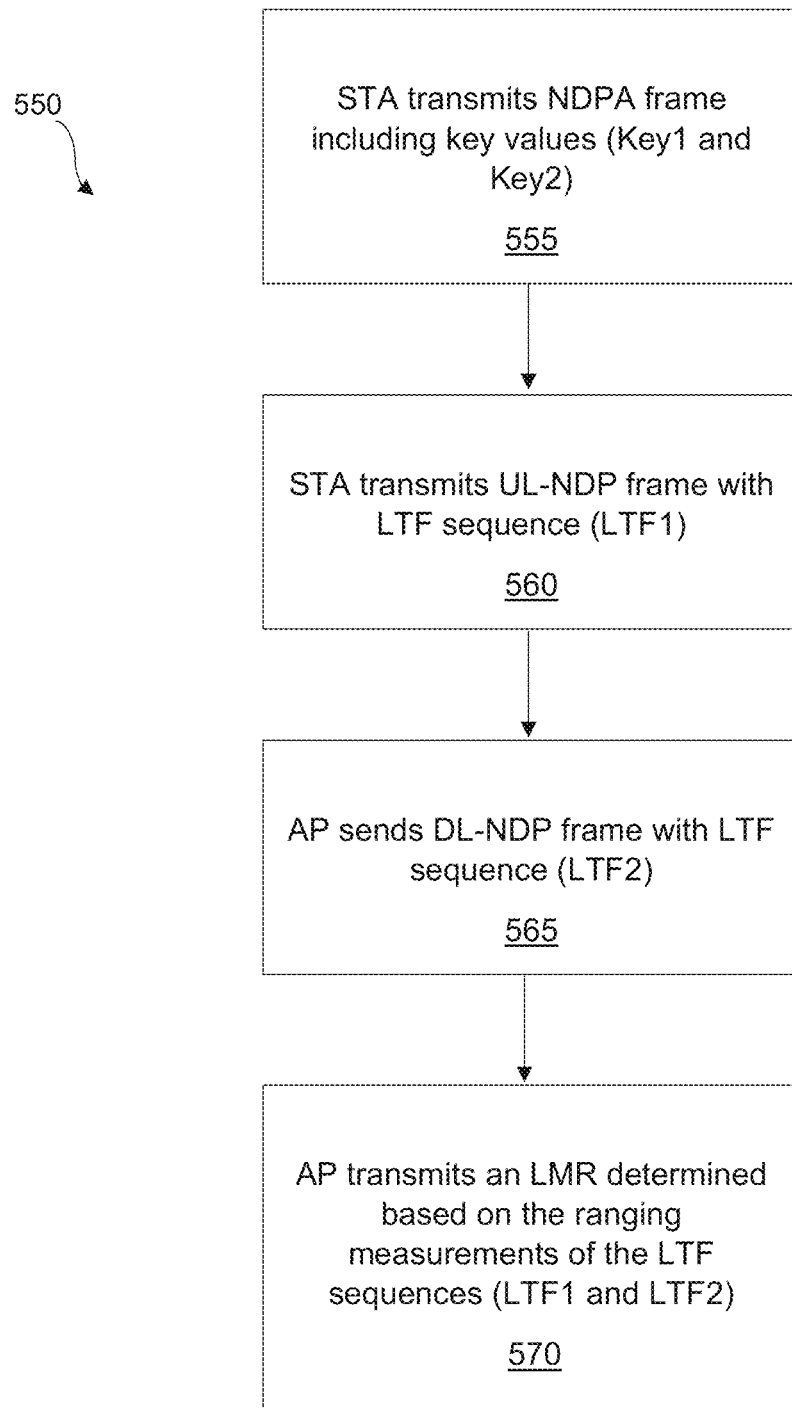
FIG. 5B is a flow chart depicting an exemplary sequence of computer implemented steps for performing a method of secure ranging measurement between a STA and an AP using key values provided in an NDPA to determine an LTF sequence according to embodiments of the present invention.

FIG. 5B is a flow chart depicting an exemplary sequence of computer implemented steps 550 for performing a method of secure ranging measurement between a STA and an AP according to embodiments of the present invention. At step 555, a NDPA frame is transmitted by a STA including key values Key1 and Key2. Key1 in NDPA indicates an LTF sequence value of LTF1, and Key2 in NDPA indicates an LTF value of LTF2. At step 560, a UL-NDP frame is sent by the STA including LTF sequence LTF1. At step 565, a DL NDP frame is sent by the AP including LTF sequence LTF2. At step 570, the AP transmits an LMR determined based on the ranging measurements of the LTF sequences LTF1 and LTF2.

Figure 6:
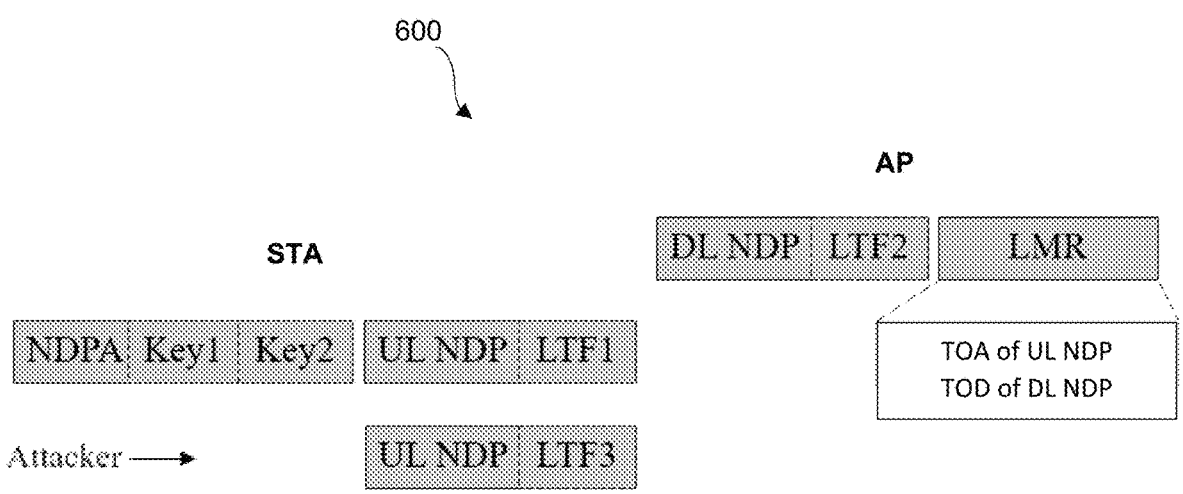
FIG. 6 is a transmit and receive diagram depicting an exemplary method for providing key values in an NDPA according to embodiments of the present invention, where the attacker does not know the LTF sequences derived from Key1 or Key2 and the AP disregards the LTF sequence received from the attacker as signal noise.

As depicted in FIG. 6, according to transmit and receive sequence 600, if the attacker does not know the LTF sequences derived from Key1 or Key2, the AP will disregard the LTF sequence received from the attacker as signal noise. According to some embodiments, key values are also stored in an LMR frame to indicate the LTF sequence as described above with regard to FIGS. 3 and 4.

Exemplary NGP NDPA Frame

Embodiments of the present invention may be implemented using NGP NDPA Frames in the form of a Very High Throughput (VHT) NDP Announcement frames, High Efficiency (HE) NDP Announcement frames and an NGP Announcement frames. The VHT, HE, and NGP formats are distinguished by the setting of the HE subfield and the NGP subfield in the Sounding Dialog Token (SDTK) field as depicted in Table I.

TABLE I

|  | B0 | B1 | B2 | B7 |
|---|---|---|---|---|
| Octets: | NGP 1 | HE 1 | Sounding Dialog Token Number 6 | |

The NGP subfield in the Sounding Dialog Token field is set to 1 to identify the frame as a NGP NDP Announcement frame. The NGP NDP Announcement frame is used for a secure LTF measurement exchange mode of the VHTz and HEz ranging protocol. The NGP NDP Announcement may use the same Frame Control subtype as the VHT NDP Announcement. An exemplary NGP Announcement frame is shown below in Table II.

TABLE II

| | Frame Control | Duration | RA | TA | Sounding Dialog Token | STA Info 1 | ... | STA Info n | FCS |
|---|---|---|---|---|---|---|---|---|---|
| Octets: | 2 | 2 | 6 | 6 | 1 | 4 | | 4 | 4 |

Providing Key Values in RMKM Frame Provided by STA

Figure 7A:
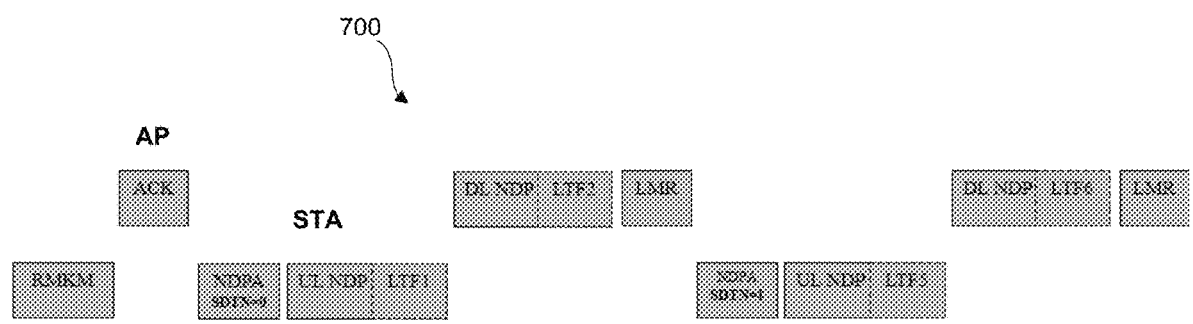
FIG. 7A depicts an exemplary transmit and receive sequence for providing key values using an STA for each ranging measurement sequence using a protected ranging measurement key management frame including one or more pairs of a sounding dialog token number and key values for determining LTF sequences used in a UL-NDP and a DL-NDP for subsequent ranging measurement sequences according to embodiments of the present invention.

With regard to FIG. 7A, an exemplary transmit and receive sequence 700 for providing key values using an STA for each ranging measurement sequence using a protected ranging measurement key management frame (RMKM) or a protected FTM response frame. The RMKM is sent by an AP to a STA includes one or more pairs of a sounding dialog token number (SDTN) and key values for determining LTF sequences used in a UL-NDP and a DL-NDP for subsequent ranging measurement sequences. In the ranging measurement sequences, LTF sequences used in a UL-NDP and a DL-NDP are identified by the SDTK in an NDPA frame.

Figure 7B:
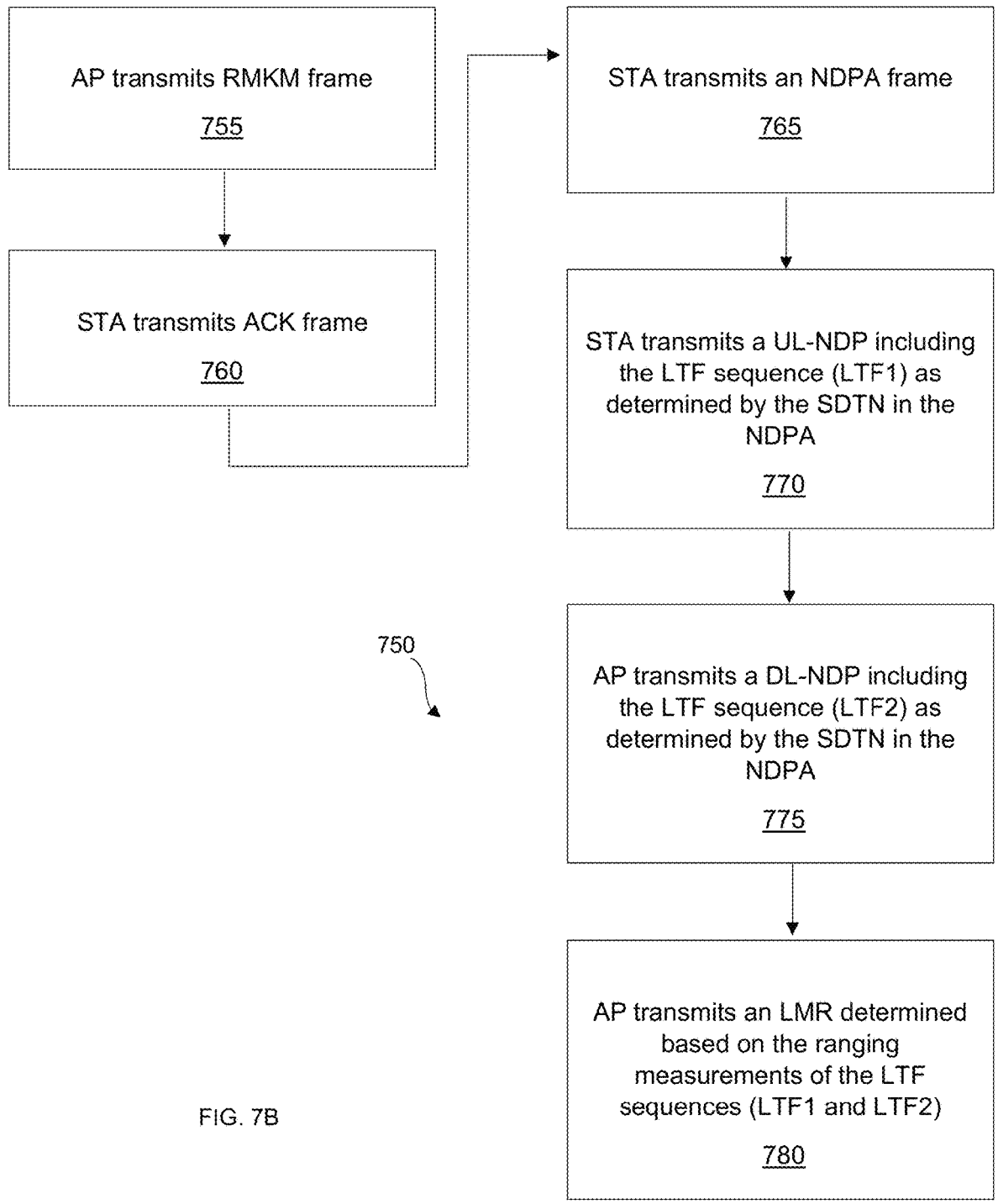
FIG. 7B is a flow chart depicting an exemplary sequence of computer implemented steps for performing a method of secure ranging measurement between a STA and an AP using a protected ranging measurement key management frame according to embodiments of the present invention.

FIG. 7B is a flow chart depicting an exemplary sequence of computer implemented steps 750 for performing a method of secure ranging measurement between a STA and an AP according to embodiments of the present invention. At step 755, a RMKM frame is transmitted by an AP and receiving by an STA. At step 760, an acknowledgement (ACK) frame is transmitted responsive to the RMKM frame. At step 765, the STA transmits an NDPA frame including a SDTN equal to 0 used to determine LTF sequences used in the subsequent UL-NDP and DL-NDP frames for ranging measurement sequences. At step 770, the STA transmits a UL-NDP including the LTF sequence LTF1 as determined by the SDTN in the NDPA. At step 775, the AP transmits a DL-NDP including the LTF sequence LTF2 as determined by the SDTN in the NDPA. At step 780, the AP transmits an The NGP NDP Announcement frame contains at most 1 STA Info field per STA. The RID11/AID11 subfield contains the 11 least significant bits of the RID or AID of a STA expected to process the following VHTz NDP in VHTz mode and prepare the location measurement report. In HEz mode, the encoding of the RID11/AID11 subfield is variable.

The Disambiguation subfield is set to 1 to prevent a non-HE VHT STA from wrongly determining its AID in the NDP Announcement frame. The Disambiguation subfield coincides with the MSB of the AID12 subfield of an expected VHT NDP Announcement when the NGP NDP Announcement field is parsed by a non-HE VHT STA. The MSB of the AID12 subfield is always 0 for a non-HE VHT STA due to the limitation of the AID to a maximum of 2007.

Secure LTF Measurement Exchange

According to some embodiments of the present invention, a Secure LTF Required field of an NGP Parameters field is set to 1 to enable a secure LTF measurement exchange between an Initiating STA (ISTA) and a responding STA (RSTA). Otherwise, the Secure LTF Required field is set to 0. An exemplary NGP Parameters element is depicted below in Table III. A Secure LTF Support field may be set to 1 in the initial Fine Timing Measurement Request frame to indicate that an ISTA supports a secure LTF measurement exchange. Otherwise the Secure LTF Support field is set to 0.

TABLE III

| Element ID (255) | Length | Element ID Extension | NGP Parameters | VHTz specific subelement (optional) | HEz specific subelement (optional) | DMGz Specific subelement (optional) | EDMGz Specific subelement (optional) |
|---|---|---|---|---|---|---|---|
| 1 | 1 | 1 | variable | variable | variable | variable | variable |

An exemplary NGP Parameters field of an NGP Parameters Element is depicted in Table IV.

TABLE IV

| | Status Indication | Value | Secure LTF Required | Secure LTF Support | Number of Antennas |
|---|---|---|---|---|---|
| Bits: | 2 | 5 | 1 | 1 | 8 |

In the NGP Parameters field, the Status Indication field indicates the responding STA's response to the Fine Timing Request. When the Status Indication field is set to 3 by the responding STA, the Value field contains a duration in units of seconds; otherwise the Value field is reserved. The Number of Antennas subfield is 8 bits wide where bits 0 thru 3 indicate the number of transmit antennas and bits 4 thru 7 indicate the number of receive antennas.

An exemplary Secure LTF Parameters element contains a set of fields as depicted in Table V below. The Secure LTF Parameters element is optionally included in the initial Fine Timing Measurement frame, and the Location Measurement Report frame, as described in for a secure LTF measurement exchange mode of the VHTz and HEz ranging protocol.

TABLE V

| | Element ID (255) | Length | Element ID Extension | LTF Sequence Generation Information | LTF Generation SAC | Range Measurement SAC |
|---|---|---|---|---|---|---|
| Octets: | 1 | 1 | 1 | variable | variable | variable |

The LTF Sequence Generation Information field is used to determine the randomized LTF sequence of an UL-NDP and DL-NDP immediately followed after the NGP NDPA frame when in a VHTz mode. The keys or cipher sequence (if needed) for LTF Sequence Generation are the result of the FTM negotiation. This field is present in the Location Measurement Report frame transmitted from an RSTA to an ISTA and is reserved otherwise.

The LTF Generation SAC field is used to authenticate that the randomized LTF sequence is generated from a reliable LTF Sequence Generation Information. The value of the LTF Generation SAC field is associated with LTF Sequence Generation Information carried in the same Secure LTF Parameters element. This field is present in the Location Measurement Report frame transmitted from an RSTA to an ISTA and is reserved otherwise. According to some embodiments, when the LTF Sequence in a first received NDP does not match, both a second NDP and LMR are transmitted; however, in this case, the LMR carries a vulnerable security information.

The Range Measurement SAC field is used to verify that range measurement results of the Location Measurement Report frame are calculated using the same LTF sequence between ISTA and RSTA.

Exemplary Fine Time Measurement Frame

An exemplary Fine Timing Measurement frame is depicted in Table VI below. The Secure LTF Parameters field is present in the initial Fine Timing Measurement frame if the responder has received the initial Fine Timing Measurement Request frame where the Secure LTF Required subfield of the NGP Parameters field is equal to 1. The Secure LTF Parameters field is optionally present in the initial Fine Timing Measurement frame if the responder has received the initial Fine Timing Measurement Request frame where the Secure LTF Support subfield of the NGP Parameters field is equal to 1. Otherwise, it not present. If present, it contains a Secure LTF Parameters element.

TABLE VI

| Category | Public Action | Dialog Token | Followup Dialog Token | ToD | ToA | ToD Error | ToA Error |
|---|---|---|---|---|---|---|---|
| 1 | 1 | 1 | 1 | 6 | 6 | 1 | 1 |
| LCI Report (optional) | Location Civic Report (optional) | Fine Timing Measurement Parameters (optional) | Fine Timing Measurement Synchronization Information (optional) | Next Generation Positioning Parameters (optional) | Secure LTF Parameters (optional) | | |
| variable | variable | variable | variable | variable | variable | | |

The Location Measurement Report frame is an Action No Ack frame of category NGP. The Location Measurement Report frame is used to support the VHTz, HEz, DMGz, and eDMGz ranging mechanisms of the FTM procedure described above. The format of the Location Measurement Report Action field is depicted in Table VII.

TABLE VII

| Category | Public Action | Dialog Token | ToD | ToA | ToD Error | ToA Error |
|---|---|---|---|---|---|---|
| 1 | 1 | 1 | 6 | 6 | 2 | 2 |
| | Secure LTF Parameters (optional) | | | NGP CSI Information (optional) | | |
| | variable | | | variable | | |

Fine Timing Measurement Procedure Negotiation

A secure LTF measurement exchange mode of the VHTz and HEz ranging protocol may be activated by an ISTA and an RSTA for using randomized LTF sequences in an UL-NDP and a DL-NDP. In this case, the ISTA and the RSTA follow the rules described in the Secure LTF Measurement Exchange Protocol.

An RSTA in which dot11SecureLTFImplemented is true shall set the Secure LTF Support field in the Extended Capabilities element to 1. An ISTA in which dot11SecureLTFImplemented is true sets the Secure LTF Support field to 1 in the NGP Parameters field in an initial Fine Timing Measurement Request frame. When an RSTA has set the Secure LTF Support field to 1 in the Extended Capabilities element it transmits, an ISTA with dot11SecureLTFImplemented set equal to true may set the Secure LTF Required subfield in the NGP Parameters field in an initial Fine Timing Measurement Request frame to 1 to activate a secure LTF measurement exchange mode between the ISTA and the RSTA When an ISTA has set the Secure LTF Support field to 1 in the NGP Parameters field in an initial Fine Timing Measurement Request frame it transmits, an RSTA with dot11SecureLTFImplemented equal to true may set the Secure LTF Required subfield in the NGP Parameters field in an initial Fine Timing Measurement frame to 1 to activate a secure LTF measurement exchange mode between the ISTA and the RSTA, An initial Fine Timing Measurement frame contains a Secure LTF Parameters field with a new LTF Generation SAC and a new LTF Sequence Generation Information associated with the LTF Generation SAC when one of the following conditions is met:
1. An RSTA received an initial Fine Timing Measurement Request frame where the Secure LTF Required subfield in the NGP Parameters field in the received initial Fine Timing Measurement Request frame is equal to 1.
2. An RSTA sets the Secure LTF Required subfield in the NGP Parameters field in a transmitted initial Fine Timing Measurement frame to 1. When management frame protection is negotiated, a STA shall use the Protected Dual of Public Action frames for an initial Fine Timing Measurement Request, an initial Fine Timing Measurement, and a Location Measurement Report. An ISTA in which dot11SecureLTFImplemented is false ignores a Secure LTF Parameters if an initial Fine Timing Measurement frame and a Location Measurement Report frame carries the Secure LTF Parameters.

Secure LTF Measurement Exchange Protocol

The secure LTF Measurement Exchange Protocol includes an initial measurement sequence, where an ISTA sends an NGP NDP Announcement frame. The LTF Generation Security Access Code (SAC) subfield in the STA Info field in the NGP NDP Announcement frame is set to the same value as in the LTF Generation SAC field in the Secure LTF Parameters field in an initial Fine Timing Measurement frame. The LTF sequence of an UL-NDP transmits a SIFS after the NGP NDP Announcement frame and the LTF sequence of a DL-NDP received a SIFS after the UL-NDP are determined by the LTF Sequence Generation Information in the Secure LTF Parameters field in the initial Fine Timing Measurement frame that is associated with the LTF Generation SAC subfield in the STA Info field in the transmitted NGP NDP Announcement.

In one exemplary measurement sequence, an ISTA that correctly received a Secure LTF Parameters field in a Location Measurement Report frame sends a NGP NDP Announcement frame. The LTF Generation SAC subfield in the STA Info field in the NGP NDP Announcement frame is set to the same value as in the LTF Generation SAC field in the Secure LTF Parameters field in the Location Measurement Report frame. The LTF sequence of an UL-NDP transmits a SIFS after the NGP NDP Announcement frame and the LTF sequence of a DL-NDP received a SIFS after the UL-NDP are determined by the LTF Sequence Generation Information in the Secure LTF Parameters field in the Location Measurement Report frame that is associated with the LTF Generation SAC subfield in the STA Info field in the transmitted NGP NDP Announcement.

In another exemplary measurement sequence, an ISTA that did not correctly receive a Secure LTF Parameters field in a Location Measurement Report frame sends a NGP NDP Announcement frame. The LTF Generation SAC subfield in the STA Info field in the NGP NDP Announcement frame is set to a pre-determined value to indicate that a new LTF Sequence Generation information is needed. The LTF sequence of an UL-NDP transmitted a SIFS after the NGP NDP Announcement frame and the LTF sequence of a DL-NDP received a SIFS after the UL-NDP are determined according to the pre-determined sequence.

When an RSTA receives a NGP NDP Announcement frame and a value of the LTF Generation SAC subfield in the STA Info field in the NGP NDP Announcement frame is equal to a value of the LTF Generation SAC subfield in the Secure LTF Parameters field stored at the RSTA, the RSTA determines the LTF sequence of an UL-NDP received a SIFS after the NGP NDP Announcement frame and the LTF sequence of a DL-NDP transmitted a SIFS after the UL-NDP with the LTF Sequence Generation Information associated with the value of the LTF Generation SAC subfield in the STA Info field in the NGP NDP Announcement frame. The RSTA shall respond with the DL-NDP and a Location Measurement Report frame a SIFS after the DL-NDP, where the Location Measurement Report frame shall contain a Secure LTF Parameters field with a new LTF Generation SAC and a new LTF Sequence Generation Information associated with the LTF Generation SAC.

When an RSTA receives a NGP NDP Announcement frame and a value of the LTF Generation SAC subfield in the STA Info field in the NGP NDP Announcement frame is not equal to a value of the LTF Generation SAC subfield in the Secure LTF Parameters field stored at the RSTA, the RSTA discards the received NGP NDP Announcement frame and UL-NDP. The RSTA does not send a DL-NDP and a Location Measurement Report frame and it keeps a current LTF Generation SAC and its associated LTF Sequence Generation Information stored at the RSTA.

When a RSTA receives a NGP NDP Announcement frame and a value of the LTF Generation SAC subfield in the STA Info field in the NGP NDP Announcement frame is equal to a pre-determined value, the RSTA determines the LTF sequence of an UL-NDP received a SIFS after the NGP NDP Announcement frame and the LTF sequence of a DL-NDP transmitted a SIFS after the UL-NDP to the corresponding pre-determined sequence. The RSTA shall respond with the DL-NDP and a Location Measurement Report frame a SIFS after the DL-NDP, where the Location Measurement Report frame shall contain a Secure LTF Parameters field with a new LTF Generation SAC and a new LTF Sequence Generation Information associated with the LTF Generation SAC.

When a Location Measurement Report frame contains range measurement results calculated from an UL-NDP and a DL-NDP that have a secure LTF sequence suitable for a range measurement, an RSTA includes the Secure LTF Parameters field in the Location Measurement Report frame and sets a value of the Range Measurement SAC subfield in the Secure LTF Parameters field in the Location Measurement Report frame to the same value as in the LTF Generation SAC field in the NGP NDP Announcement frame that solicited the UL-NDP and the DL-NDP.

Exemplary Computer System

Embodiments of the present invention are drawn to electronic systems for providing securing ranging measurements for wireless devices. The following discussion describes one such exemplary electronic system or computer system can be used as a platform for implementing embodiments of the present invention.

Figure 8:
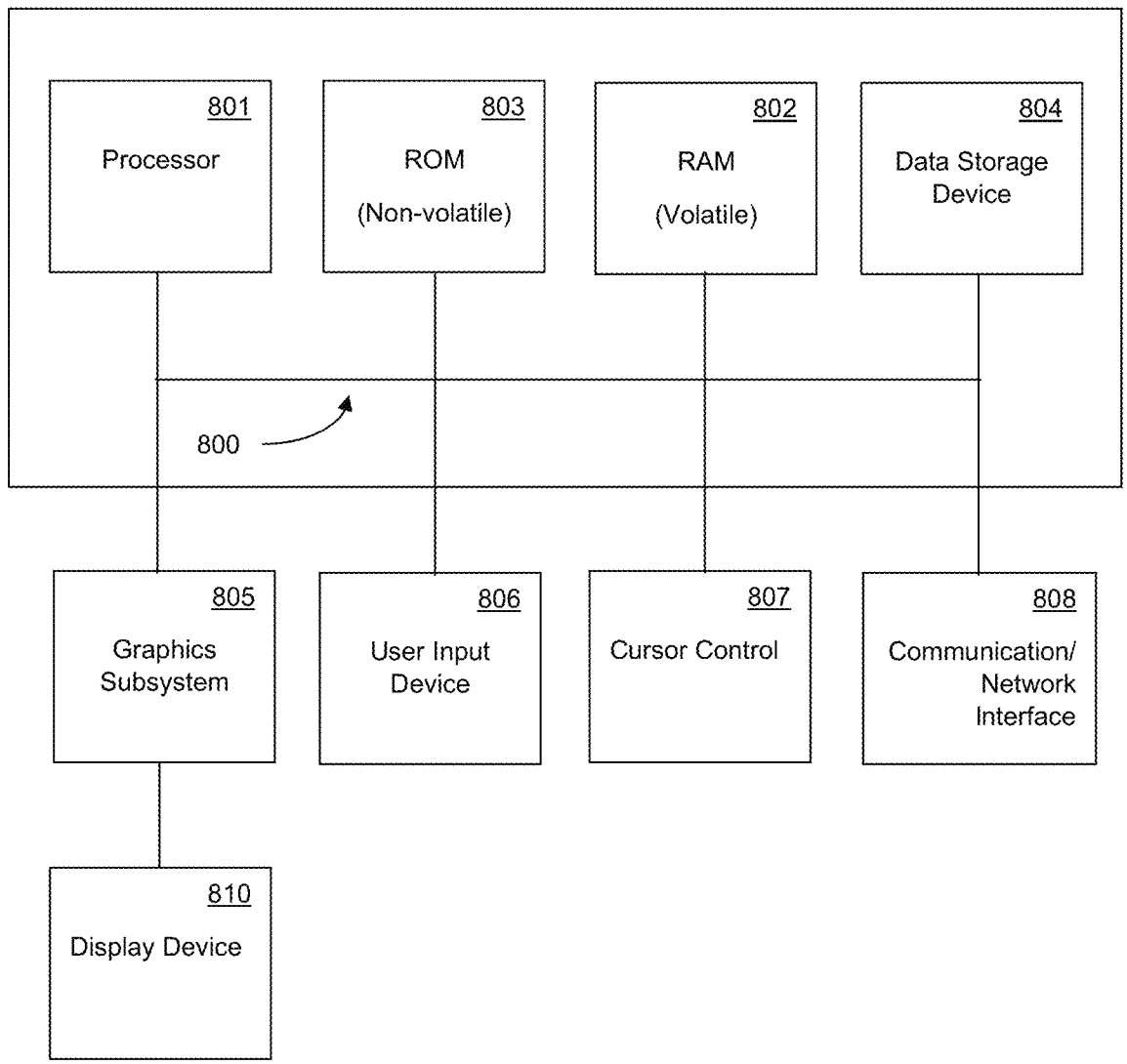
FIG. 8 is a block diagram of an exemplary computer system (e.g., STA or AP) upon which embodiments of the present invention may be implemented.

In the example of FIG. 8, the exemplary computer system 812 (e.g., a wireless access point or wireless station) includes a central processing unit (CPU) 801 for running software applications and optionally an operating system. Random access memory 802 and read-only memory 803 store applications and data for use by the CPU 801. Data storage device 804 provides non-volatile storage for applications and data and may include fixed disk drives, removable disk drives, flash memory devices, and CD-ROM, DVD-ROM or other optical storage devices. The optional user inputs 806 and 807 comprise devices that communicate inputs from one or more users to the computer system 812 (e.g., mice, joysticks, cameras, touch screens, and/or microphones).

A communication or network interface 808 allows the computer system 812 to communicate with other computer systems, networks, or devices via an electronic communications network, including wired and/or wireless communication and including an Intranet or the Internet. The optional display device 810 may be any device capable of displaying visual information in response to a signal from the computer system 812 and may include a flat panel touch sensitive display, for example. The components of the computer system 812, including the CPU 801, memory 802/803, data storage 804, user input devices 806, and graphics subsystem 805 may be coupled via one or more data buses 800.

In the embodiment of FIG. 8, an optional graphics subsystem 805 may be coupled with the data bus and the components of the computer system 812. The graphics system may comprise a physical graphics processing unit (GPU) 805 and graphics/video memory. GPU 805 may include one or more rasterizers, transformation engines, and geometry engines, and generates pixel data from rendering commands to create output images. The physical GPU 805 can be configured as multiple virtual GPUs that may be used in parallel (e.g., concurrently) by a number of applications or processes executing in parallel, or multiple physical GPUs may be used simultaneously. Graphics sub-system 805 outputs display data to optional display device 810. The display device 810 may be communicatively coupled to the graphics subsystem 805 using HDMI, DVI, DisplayPort, VGA, etc.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of performing a ranging measurement using a wireless access point, the method comprising:
  a) transmitting a key management frame from a first wireless device, wherein the key management frame comprises a plurality of key values and associated long training field (LTF) Generation SACs;
  b) receiving a first null data packet (NDP) announcement frame comprising the LTF Generation SACs from a second wireless device;
  c) receiving an UL-NDP frame from the second wireless device, wherein the UL-NDP frame comprises a first LTF sequence determined according to a first key value of the plurality of key values;
  d) transmitting a DL-NDP frame transmitted from the first wireless device, wherein the DL-NDP frame comprises a second LTF sequence determined according to a second key value of the plurality of key values; and
  e) computing ranging measurements between the first wireless device and the second wireless device using the first and second LTF sequences;
  f) determining that the first LTF sequence is invalid based on the key values;
  g) the first wireless device transmitting a second NDP announcement frame indicating that new LTF generation information is needed responsive to the determining;
  h) receiving a third LTF sequence responsive to the second NDP announcement frame.

2. A method as described in claim 1, further comprising authenticating that the first LTF sequence and the second LTF sequence are generated from reliable LTF Sequence Generation Information using the associated LTF Generation SACs.

3. A method as described in claim 1, further comprising determining that the first LTF sequence is invalid based on the key values.

4. A method as described in claim 3, further comprising disregarding the first LTF sequence as signal noise when the first LTF sequence is determined to be invalid.

5. A method as described in claim 1, further comprising transmitting an acknowledgement frame responsive to the key management frame.

6. A method as described in claim 1, wherein the first NDP announcement frame comprises a VHT First NDP announcement frame.

7. A method as described in claim 1, wherein the first NDP announcement frame comprises an HE First NDP announcement frame.

8. A device for performing a ranging measurement using a wireless access point, the device comprising:
   a memory for storing data; and
   a processor communicatively coupled to the memory and configured to execute instructions for performing a method of ranging measurement, the method comprising:
   a) receiving a key management frame, wherein the key management frame comprises a plurality of key values and associated LTF Generation SACs;
   b) transmitting a first NDP announcement frame, wherein the First NDP announcement frame comprises the LTF Generation SACs;
   c) transmitting a UL-NDP frame, wherein the UL-NDP frame comprises a first LTF sequence determined according to a first key value of the plurality of key values;
   d) receiving a DL-NDP frame from a first wireless device, wherein the DL-NDP frame comprises a second LTF sequence corresponding to a second key value of the plurality of key values;
   e) receiving a ranging measurements between the first wireless device and the second wireless device, wherein the ranging measurement is computed using the first and second LTF sequences;
   f) determining that the first LTF sequence is invalid based on the key values;
   g) the first wireless device transmitting a second NDP announcement frame indicating that new LTF generation information is needed responsive to the determining; and
   h) receiving a third LTF sequence responsive to the second NDP announcement frame.

9. A device as described in claim 8, wherein the method further comprises receiving an acknowledgement frame responsive to the key management frame.

10. A device as described in claim 8, wherein the first NDP announcement frame comprises a VHT NDP announcement frame.

11. A device as described in claim 8, wherein the first NDP announcement frame comprises an HE NDP announcement frame.

12. A device for performing a ranging measurement between wireless devices, the device comprising:
   a memory for storing data; and
   a processor communicatively coupled to the memory and configured to execute instructions for performing a method of ranging measurement, the method comprising:
   a) transmitting a key management frame from a first wireless device, wherein the key management frame comprises a plurality of key values and associated long training field (LTF) Generation SACs;
   b) receiving a first null data packet (NDP) announcement frame comprising the LTF Generation SACs from a second wireless device;
   c) receiving an UL-NDP frame from the second wireless device, wherein the UL-NDP frame comprises a first LTF sequence corresponding to a first key value;
   d) transmitting a DL-NDP frame transmitted from the first wireless device,
   wherein the DL-NDP frame comprises a second LTF sequence corresponding to a second key value;
   e) authenticating that the first LTF sequence and the second LTF sequence are generated from reliable LTF Sequence Generation Information using the associated LTF Generation SACs; and
   f) computing ranging measurements between the first wireless device and the second wireless device using the first and second LTF sequences;
   g) determining that the first LTF sequence is invalid based on the key values:
   h) the first wireless device transmitting a second NDP announcement frame indicating that new LTF generation information is needed responsive to the determining: and
   i) receiving a third LTF sequence responsive to the second NDP announcement frame.

13. A device as described in claim 12, wherein the method further comprises determining that the first LTF sequence is invalid based on the key values.

14. A device as described in claim 13, wherein the method further comprises disregarding the first LTF sequence as signal noise when the first LTF sequence is determined to be invalid.

15. A device as described in claim 12, wherein the method further comprises transmitting an acknowledgement frame responsive to the key management frame.

16. A device as described in claim 12, wherein the first NDP announcement frame comprises a VHT NDP announcement frame.

17. A device as described in claim 12, wherein the first NDP announcement frame comprises an HE NDP announcement frame.

* * * * *